United States Patent
Hidaka (10) Patent No.: US 7,078,648 B2
(45) Date of Patent: Jul. 18, 2006

(54) CURVED ELECTRODE FOR WELDING

(75) Inventor: Masato Hidaka, Kanagawa (JP)

(73) Assignee: SMK Co., Ltd., Kanagawa (JP)

( * ) Notice: Subject to any disclaimer, the term of this patent is extended or adjusted under 35 U.S.C. 154(b) by 0 days.

(21) Appl. No.: 11/111,412

(22) Filed: Apr. 21, 2005

(65) Prior Publication Data

US 2005/0236373 A1    Oct. 27, 2005

(30) Foreign Application Priority Data

Apr. 22, 2004  (JP) .............................. 2004-126188

(51) Int. Cl.
*B23K 11/30*  (2006.01)
(52) U.S. Cl. ...................... 219/120; 219/119
(58) Field of Classification Search ................ 219/119, 219/120, 86.25, 86.31
See application file for complete search history.

(56) References Cited

U.S. PATENT DOCUMENTS

| | | | | |
|---|---|---|---|---|
| 1,256,951 A | * | 2/1918 | Thomson | 219/120 |
| 2,215,289 A | * | 9/1940 | Hensel et al. | 219/120 |
| 2,374,979 A | * | 5/1945 | Carlson et al. | 219/120 |
| 2,489,993 A | * | 11/1949 | Wood | 219/120 |
| 4,517,435 A | * | 5/1985 | Humblot | 219/89 |
| 5,126,528 A | * | 6/1992 | Bush et al. | 219/119 |

FOREIGN PATENT DOCUMENTS

JP    07-060458    3/1995

* cited by examiner

*Primary Examiner*—Jonathan Johnson
*Assistant Examiner*—Rachel E. Beveridge
(74) *Attorney, Agent, or Firm*—Carrier, Blackman & Associates, P.C.; Joseph P. Carrier; William D. Blackman (57) ABSTRACT

A curved electrode includes an installing portion to be installed in an electrode holder, an offset portion by which the offset amount is obtained, and a tip portion which comes into contact with the material to be welded W, the portions being formed separately and assembled together. A vertical hole and a horizontal hole are formed within the installing portion, an axis hole is formed within the offset portion, and a water supply tube is inserted into a cooling hole which is constructed of the vertical hole, the horizontal hole and the axis hole. C-chamfering or R-chamfering is conducted to a corner where the vertical hole and the horizontal hole intersect. An object of the present invention is to provide a curved electrode which can be manufactured easily at a low cost, and if a part of it is damaged, only that part needs to be replaced at a low cost. The durability of the curved electrode can be improved at the same time.

13 Claims, 5 Drawing Sheets

CURVED ELECTRODE FOR WELDING

BACKGROUND OF THE INVENTION

1. Field of the Invention

The present invention relates to an improved curved electrode which is used for a resistance welding apparatus, for example.

2. Description of the Background Art

Conventionally, in an apparatus for resistance welding such as spot welding or the like, an electrode having a curved shape is used due to the shape of a material to be welded. As for the electrode having a curved shape, if the offset amount is too large, excessive moment is applied to the installing portion of the electrode due to an applied load at the time of welding. In this case, if the installing portion is fixed by taper engagement, the tapered hole is deformed into an elliptical shape, thus, it cannot be used. Therefore, there has been known a technique in which the vicinity of the installing portion of the electrode is retained by a cap nut (See Japanese Patent Application Publication No. 7-60458.

Figure 6:
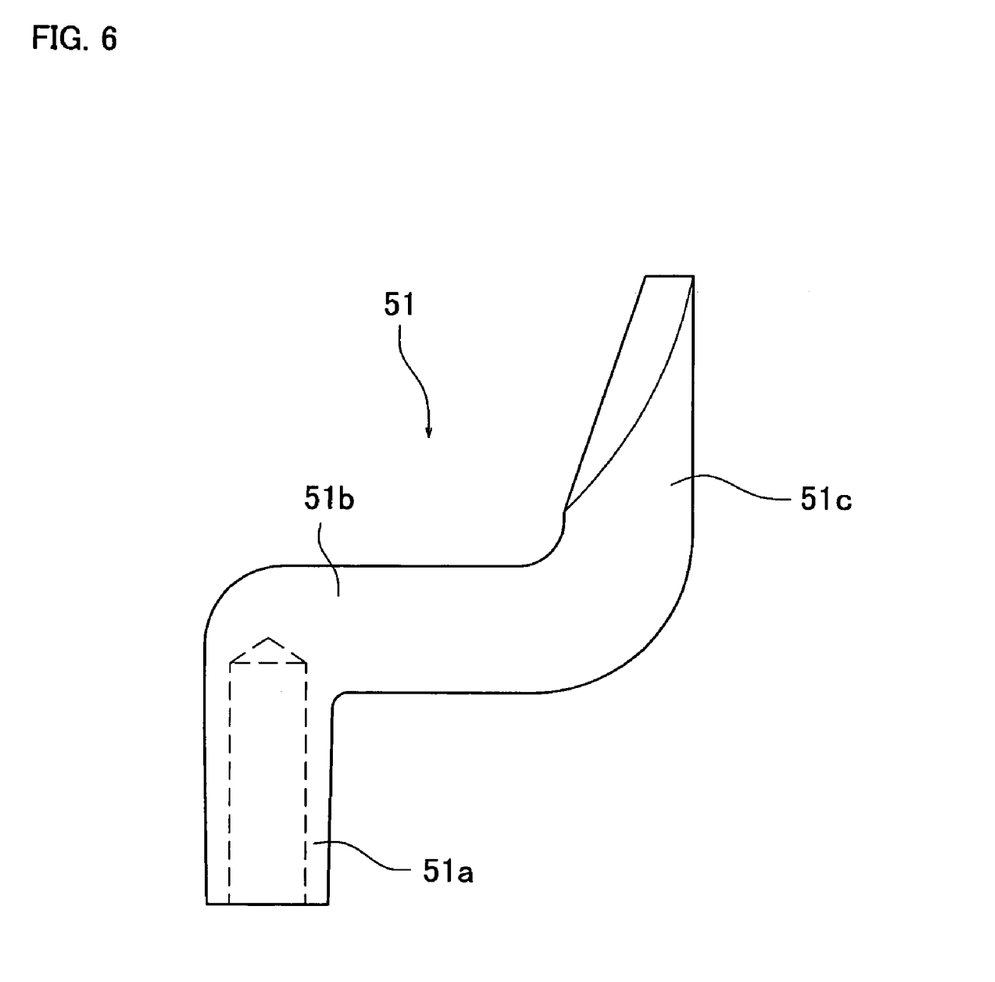
FIG. 6 a view explaining an example of a conventional curved electrode.

In the conventional curved electrode 51, as shown in FIG. 6, an installing portion 51a to be installed in an electrode holder or the like, an offset portion 51b by which the offset amount is obtained, and a tip portion 51c which comes into contact with a material to be welded are formed unitarily. Therefore, it takes a lot of time to manufacture, and the cost is high. Also, when the tip portion 51c is worn, the entire device needs to be replaced, which increases the maintenance cost. Additionally, in a case where a cooling passage is formed into the curved electrode 51, although a linear cooling passage such as that shown by a broken line in FIG. 6 can be formed in the installing portion 51a, it is difficult to extend the cooling passage toward the offset portion 51b and the tip portion 51c. Therefore, the electrode easily suffers from heat damage, and its durability is poor.

An object of the present invention is to provide a curved electrode which can be manufactured easily at a low cost, and replaced at a low cost in a case where a part of it is damaged, and in which the durability can be improved at the same time.

SUMMARY OF THE INVENTION

To achieve the above-mentioned object, according to an aspect of the present invention, there is provided a curved electrode for welding comprising an installing portion to be installed in an electrode holder, an offset portion by which an offset amount is obtained, and a tip portion which comes into contact with a material to be welded. At least the installing portion is formed separately from the offset portion and engaged into a tapered hole formed within the offset portion, the installing portion has a substantially T-shaped or L-shaped cooling hole formed in the inside thereof and constructed of a vertical hole and a horizontal hole intersecting at a substantially right angle, and the offset portion has another cooling hole formed in the inside thereof so as to correspond and connect with the horizontal hole and extend toward the tip portion, wherein C-chamfering or R-chamfering is conducted to at least a part of a corner, on a side of the tip portion, in the intersecting portion of the vertical hole and the horizontal hole of the installing portion.

By forming the installing portion separately from the offset portion and engaging the installing portion into the tapered hole of the offset portion, the curved electrode can be manufactured easily at a low cost. In addition, since a cooling hole can be easily formed inside, the performance of welding can be stabilized and consumption of the electrode can be controlled. Also, the durability of the curved electrode can be improved.

In this instance, the offset portion and the tip portion may be formed unitarily or separately. A chip for welding may be attached to the tip of the offset portion to be unitary with respect to each other by brazing.

By forming a substantially T-shaped or L-shaped cooling hole within the installing portion which is constructed of a vertical hole and a horizontal hole intersecting at a substantially right angle, forming another cooling hole within the offset portion so as to correspond and connect with the horizontal hole and extend toward the tip portion side, and conducting C-chamfering or R-chamfering to at least a part of a corner on the tip portion side in the intersecting portion of the vertical hole and the horizontal hole of the installing portion, a water supply tube such as a flexible tube can be securely inserted into the substantially T-shaped or L-shaped cooling hole. In contrast, it is difficult to insert a water supply tube in a case where two holes are only intersected because a burr sticks out in a corner of the intersecting portion where the tube passes or the shape of the corner is sharp.

According to another aspect of the present invention, the tip portion is also formed separately from the offset portion.

If all of the tip portion, the offset portion, and the installing portion are formed separately, especially when the tip portion is badly worn, only the tip portion needs to be replaced, which is effective economically.

Also, the present invention can be applied to a curved electrode having a different offset amount by replacing the offset portion alone.

Incidentally, taper engagement, a tapered screw hole, or a straight screw hole may be used as the coupling structure of the tip portion and the offset portion.

According to another aspect of the present invention, in a case where a material of the offset portion and the installing portion is nonferrous metal, when the installing portion is fixed to the tapered hole of the offset portion by taper engagement, a tapered portion of the installing portion is inserted into the tapered hole of the offset portion by hand, and press-fit further by an amount of 7.0 mm or less. In this instance, the pressure of inserting by hand is generally within the range of 0.4–0.6 kgf.

By press-fitting the installing portion into the tapered hole of the offset portion further after inserting, it is possible to secure the engagement, and control flexure of the offset portion at the time of applying load to the tip portion for welding. However, if the press-fitting amount exceeds 7.0 mm, the tapered hole of the offset portion will be deformed, and cooling water will leak from the taper engagement in a case where a cooling hole is formed inside.

According to another aspect of the present invention, an R-chamfered portion having a radius R of 0.001 mm or more is provided on the periphery of the opening on the press-fitting side of the tapered hole of the offset portion and on the periphery of the end of the tapered portion of the installing portion.

With the provision of the R-chamfered portions, it is possible to prevent burrs or the like from entering the inside of the tapered hole, so as to conduct press-fitting smoothly.

According to another aspect of the present invention, a seal ring is interposed in the engagement interface between the tapered hole of the offset portion and the tapered portion of the installing portion.

The seal ring prevents water from leaking from the engagement portion. A single seal ring may be provided on the upper side. Two seal rings may be provided such that the intersecting portion of the holes is located therebetween. A groove for the seal ring may be formed in either of the installing portion or the offset portion. However, when the groove for the seal ring is formed in the installing portion, the work amount can be reduced so as to reduce the cost. The line diameter of the seal ring needs to be 0.1 mmϕ or more, and preferably around 1/50–1/5 mmϕ with respect to the outer diameter of the installing portion. If the line diameter is less than 0.1 mmϕ, hardly any sealing effect is achieved. If the line diameter is more than 1/5 mmϕ with respect to the outer diameter of the installing portion, there are cases where sufficient structural strength cannot be achieved.

Also, as a result of a durability test, it turned out that the durability is 20–30 times higher in the case of forming the groove for the seal ring in the installing portion than the case of forming the groove in the offset portion. The reasons are as follows. In the case of forming the groove for the seal ring in the offset portion as a female taper, since stress is applied in a direction where the inner diameter taper portion expands at the time of welding and warpage easily occurs, the cooling water tends to leak and the durability of the electrode is deteriorated. In contrast, in the case of forming the groove for the seal ring in the installing portion as a male taper, since stress is applied in a direction where the outer diameter taper portion shrinks at the time of welding, and also the strength of the rod body is large, the cooling water hardly leaks. In addition, when a curved electrode is used in an actual welding operation field, it is common for an operator to install or remove the curved electrode by hitting the curved electrode with a hammer. In particular, in order to easily install or remove the curved portion, a process of hitting the upper portion, the left and the right of the engagement portion is employed. In this process, the sealing effect is more easily deteriorated in the case of providing the seal ring in the offset portion than the case of providing the seal ring in the installing portion. A test result shows that the durability is 50–60 times higher in the case of providing the seal ring in the installing portion than the case of providing the seal ring in the offset portion.

As mentioned above, according to the present invention, by forming at least the installing portion separately from the offset portion and the tip portion, the curved electrode can be manufactured easily at a low cost. If a part of it is damaged, only that part needs to be replaced at a low cost.

Also, the water supply tube can be inserted securely by conducting C-chamfering or R-chamfering to the corner of the two holes of the substantially T-shaped or L-shaped hole. In addition, since the press-fitting amount between the installing portion and the offset portion is set in a predetermined range, the installing portion and the offset portion can be coupled securely so as to prevent water or the like from leaking.

In addition, the R-chamfered portions provided on the periphery of the opening on the press-fitting side of the tapered hole and the periphery of the end of the tapered portion makes the press-fitting smooth, and the seal ring interposed in the engagement interface between the tapered hole and the tapered portion can securely prevent water from leaking.

DETAILED DESCRIPTION OF THE PREFERRED EMBODIMENTS

Figure 1:
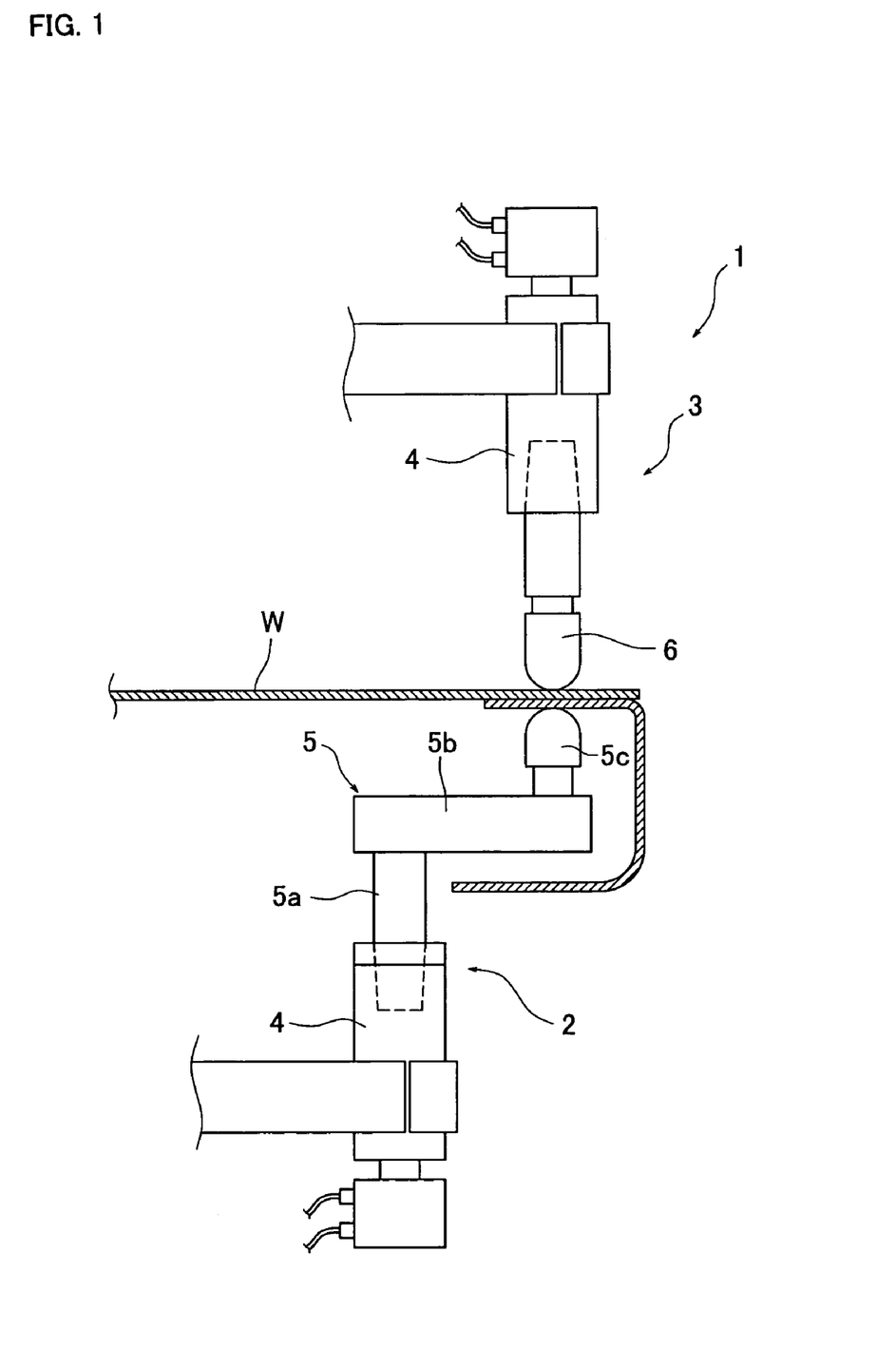
FIG. 1 is a view explaining an example of a welding apparatus in which a curved electrode according to the present invention is used.
Figure 2:
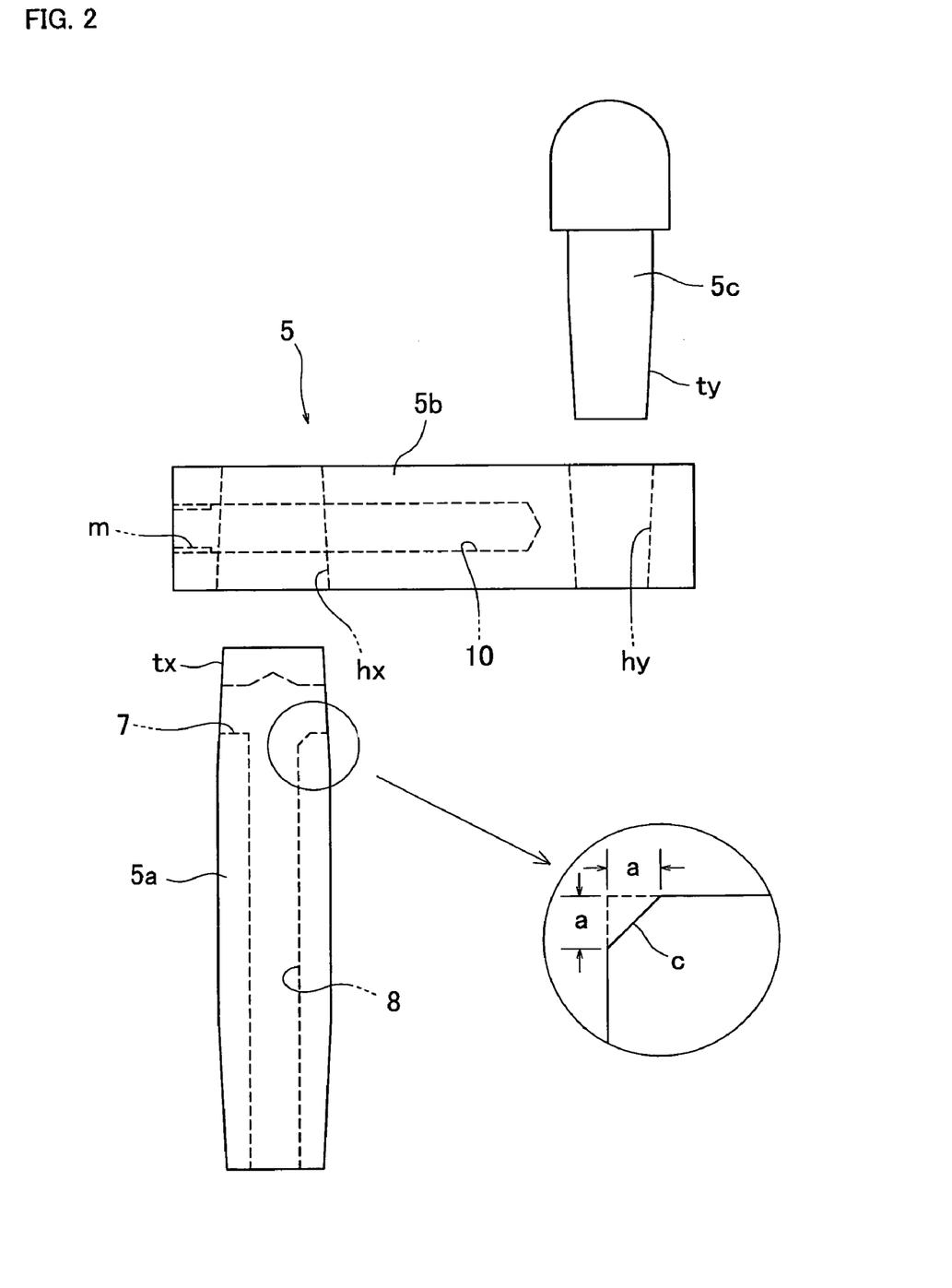
FIG. 2 is an exploded view of the curved electrode.
Figure 3:
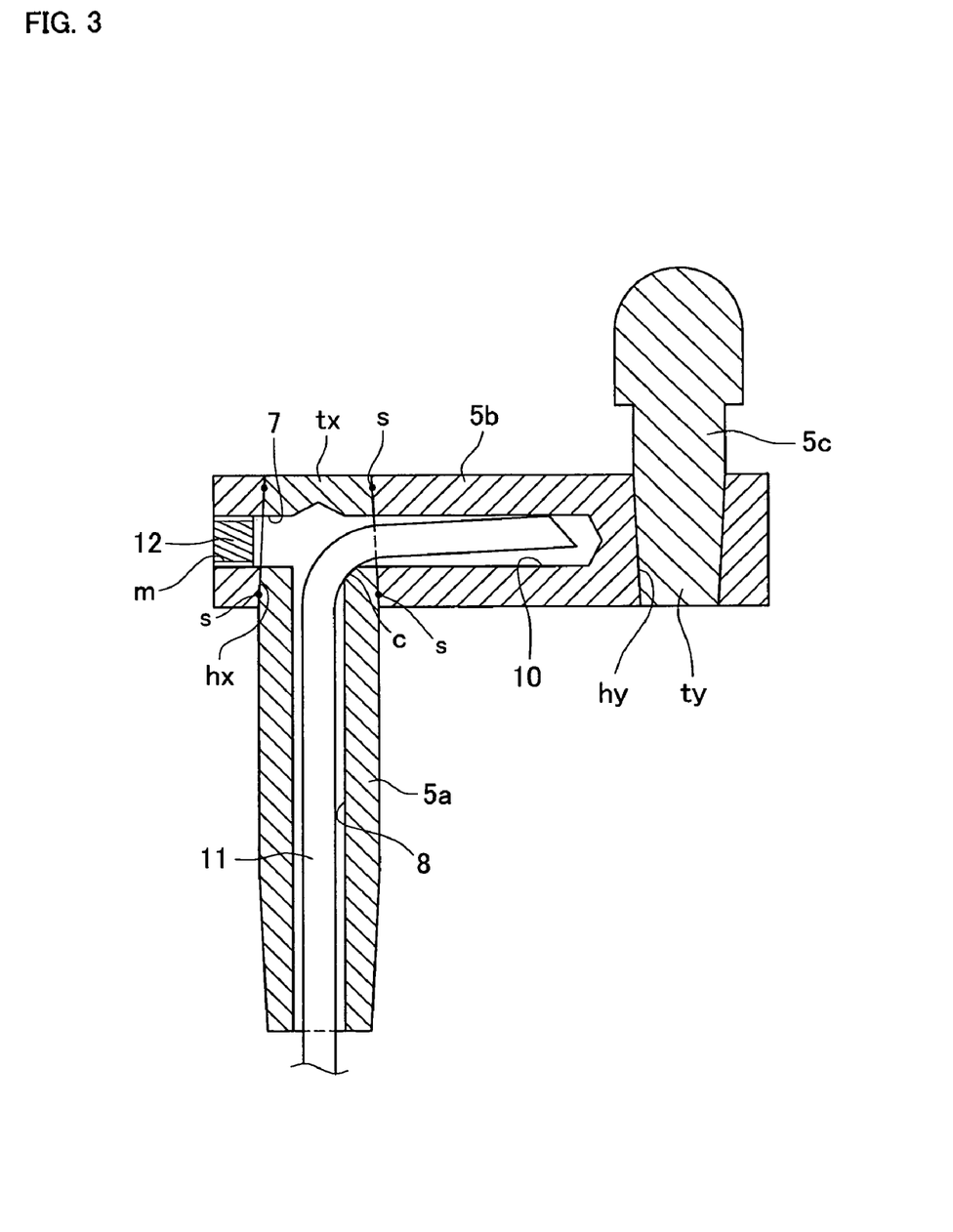
FIG. 3 is a sectional view of the curved electrode.

Preferred embodiments of the present invention will now be described with reference to the accompanying drawings. FIG. 1 is a view explaining an example of a welding apparatus in which a curved electrode according to the present invention is used, FIG. 2 is an exploded view of the curved electrode, FIG. 3 is a sectional view of the curved electrode, FIGS. 4(a) and 4(b) are views explaining a test result in which the press-fitting amount of the installing portion is changed, and FIG. 5 is a view explaining a state of chamfering a first tapered hole of the offset portion and a tapered portion of the installing portion.

The curved electrode according to the present invention can be manufactured easily at a low cost even in a case where the offset amount is to be varied. Also, even if a part of the electrode is damaged, only the damaged part needs to be replaced. In addition, the durability can be improved at the same time by directly cooling the inside of the electrode. The curved electrode according to the present invention is applied to a spot welding apparatus 1 such as that shown in FIG. 1.

The spot welding apparatus 1 is comprised of a lower electrode unit 2 which is fixed to the body of the spot welding apparatus, and an upper electrode unit 3 which can be elevated and lowered with respect to the lower electrode unit 2. A curved electrode 5 is installed in an electrode holder 4 for the lower electrode unit 2, and the curved electrode 5 has a shape which makes it possible to avoid interference with the shape of a material to be welded W.

An upper electrode 6 is installed in another electrode holder 4 for the upper electrode unit 3, and the upper electrode 6 is lowered such that the material to be welded W is sandwiched. Welding is performed by flowing a current while a certain pressure is applied to the sandwiched portion.

The curved electrode 5 is comprised of an installing portion 5a to be installed in the electrode holder 4, an offset portion 5b by which the offset amount is obtained so as to avoid interference with the material to be welded W, and a tip portion 5c which comes into contact with the material to be welded W. The installing portion 5a and the offset portion 5b are made of chromium copper in the present embodiment. The offset portion 5b has a first tapered hole $h_x$ into which a tapered portion $t_x$ of the installing portion 5a is engaged, and a second tapered hole $h_y$ into which a tapered portion $t_y$ of the tip portion 5c is engaged.

The installing portion 5a and the offset portion 5b are made of chromium copper in the present embodiment. However, aluminum, copper or a copper alloy such as brass, beryllium copper, zircochromium copper or zinc bronze may be used.

A cooling hole is formed in the center of the installing portion 5a and the offset portion 5b. Specifically, in the present embodiment, the installing portion 5a has a substantially T-shaped hole therein which is constructed of a horizontal hole 7 penetrating the tapered portion $t_x$ in the diameter direction thereof and a closed vertical hole 8 extending from the base side to be attached to the electrode holder along the axis direction.

The offset portion 5b has an axis hole 10 therein which is a closed hole extending from the end on the installing portion side to the vicinity of the second tapered hole $h_y$, through the first tapered hole $h_x$. The cooling hole is constructed of the vertical hole 8, the horizontal hole 7 and the axis hole 10. The axis hole 10 may penetrate the second tapered hole $h_y$. In this instance, a single seal ring for preventing water from leaking may be provided in the upper portion of the second tapered hole $h_y$ into which a tapered portion $t_y$ of the tip portion 5c is engaged or a screw hole in a case where the tip portion 5c is fixed by a screw. Two seal rings may be provided in the upper portion and the lower portion of the second tapered hole $h_y$ or the screw hole. An external screw m is formed in the entrance of the axis hole 10. The axis hole 10 and the horizontal hole 7 correspond and connect with each other in a straight line in a state where the tapered portion $t_x$ of the installing portion 5a is engaged into the first tapered hole $h_x$ of the offset portion 5b by press-fitting.

After the tapered portion $t_x$ of the installing portion 5a is engaged into the first tapered hole $h_x$ of the offset portion 5b by press-fitting so as to allow the axis hole 10 and the horizontal hole 7 to correspond and connect with each other, a cap 12 (FIG. 3) is screwed into the external screw m in the entrance of the axis hole 10 to cover the end. Incidentally, a seal ring s is interposed in the engagement interface between the first tapered hole $h_x$ and the tapered portion $t_x$ as shown in FIG. 3. Only one seal ring may be provided in the upper portion. Two seal rings may be provided in the upper portion and the lower portions. A water supply tube 11 made of fluorocarbon resin having a heat-resistant property is inserted from the end opening of the installing portion 5a such that the tip of the water supply tube 11 faces the closed portion of the axis hole 10. Cooling water supplied from the water supply tube 11 is ejected into the hole so as to cool the tip portion 5c and the offset portion 5b. In this instance, if the horizontal hole 7 and the vertical hole 8 are only intersected at a corner c on the side where the water supply tube 11 passes, a burr sticks out, and it is difficult to pass the water supply tube 11.

Therefore, according to the present invention, C-chamfering is conducted to the corner c so as to allow the water supply tube 11 to pass the corner smoothly. In a case where the installing portion 5a and the offset portion 5b are formed unitarily, it is difficult to conduct C-chamfering. However, according to the present embodiment, since the installing portion 5a and the offset portion 5b are formed separately, it is possible to conduct C-chamfering easily by inserting a tool from one of the openings of the horizontal hole 7 before assembly, for example.

In the present embodiment, the outer diameter of the installing portion 5a is 16 mmφ, and the amount a of C-chamfering is 0.001 mm or more so as to form a C-plane as shown in FIG. 2. However, the amount a preferably is in the range of 0.01 to [(outer diameter of installing portion 5a)×⅛] mm. Specifically, when the outer diameter of the installing portion 5a is 16 mmφ, the range of the amount a is 0.01–2 mm. When the outer diameter is 32 mmφ, the range of the amount a is 0.01–4 mm. When the outer diameter is 800 mmφ, the range of the amount a is 0.01–100 mm. In a case where the minimum of the amount a is from 0.001 to 0.01 mm, although the water supply tube 11 can be inserted, it takes a lot of hard work. Also, when welding operation is performed in a state where cooling water is flowed through the water supply tube 11, the area where the tube and the C-plane interfere with each other is cured or bent so as to narrow the inner diameter of the passage for cooling water, and thereby the flow is intercepted, which results in insufficient cooling of the tip portion of the electrode. Such insufficient cooling makes the tip end of the electrode soft and the consumption of the electrode several ten times higher. In addition, since appropriate welding strength or welding performance cannot be obtained, welding operation becomes substantially impossible. In a case where the amount a is less than 0.001 mm, the corner is projected as a knife. With this, unpreferably, the tube will be cut, scratched or bent when inserted, or it will become substantially impossible to insert the tube.

Also, when the maximum of the amount a is more than [(outer diameter of installing portion 5a)×⅛] mm, chamfering becomes difficult or substantially impossible.

Instead of C-chamfering, R-chamfering is also possible. In this instance, an R-plane having a radius R of 0.001 mm or more is formed. However, the radius R preferably is in the range of 0.01 to [(outer diameter of installing portion 5a)×⅛] mm. The reason is the same in the case of C-chamfering.

Next, coupling of the installing portion 5a and the offset portion 5b will be explained.

It is preferable that the installing portion 5a and the offset portion 5b are formed separately because the work amount can be reduced so as to reduce the cost. However, when used, the installing portion 5a and the offset portion 5b should be coupled securely so as not to be separated easily.

According to the present invention, the tapered portion $t_x$ of the installing portion 5a is inserted into the first tapered hole $h_x$ of the offset portion 5b by hand, and thereafter press-fit into further by an appropriate amount. By doing so, secure coupling can be achieved, and the durability can be improved. In a case where the offset portion 5b and the installing portion 5a are made of chromium copper, the taper angle of the first tapered hole $h_x$ and the tapered portion $t_x$ is around 1° 25' per each side, and the length of the tapered portion $t_x$ of the installing portion 5a is equal to or greater than the depth of the first tapered hole $h_x$. The tapered portion $t_x$ is inserted into the first tapered hole $h_x$ by hand at a pressure of 0.4–0.6 kgf, and thereafter press-fit further by an amount of 2.5±0.5 mm with a hydraulic vise or the like.

Figure 4:
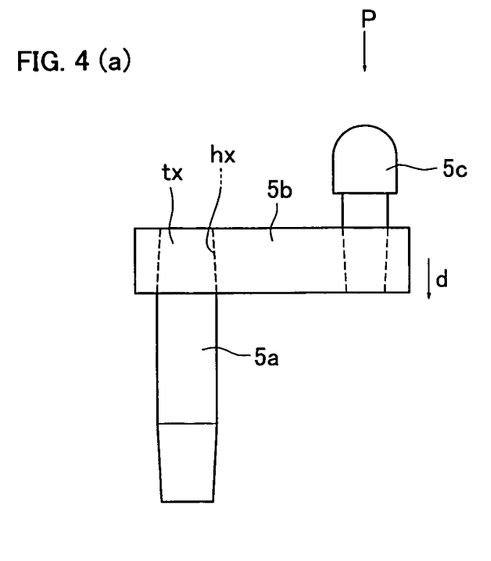
FIGS. 4(a) and 4(b) are views explaining test results in which the press-fitting amount of the installing portion is changed.
Figure 5:
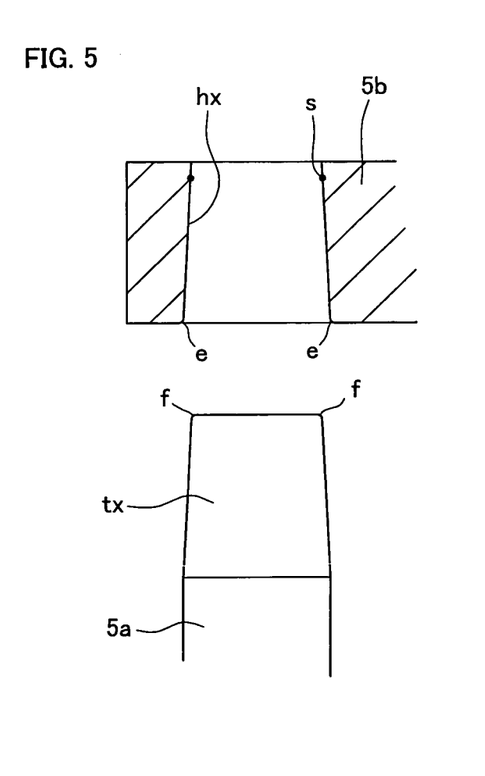
FIG. 5 is a view explaining a state of chamfering a first tapered hole of the offset portion and a tapered portion of the installing portion.

FIGS. 4(a) and 4(b) show trial results in which the press-fitting amount is changed. FIG. 4 (a) is a side view, and FIG. 4(b) is a plan view of the offset portion. In a case where the press-fitting amount was set to be 0.2 mm or less, when welding load P (the trial was conducted at an air pressure of 350 kgf in a state of being attached to a spot welding apparatus) was applied, the warpage amount d was large, load on the engagement portion of the first tapered hole $h_x$ and the tapered portion $t_x$ was also large, and water leaked from the engagement portion.

In a case where the press-fitting amount was set to be 3.7 mm or more, the first tapered hole $h_x$ expanded too much in a direction shown as Z—Z in FIG. 4(b). After 60 seconds from the trial, water started leaking from the engagement portion of the first tapered hole $h_x$ and the tapered portion $t_x$.

In contrast, in a case where the press-fitting amount was set to be 2.0 mm, the warpage amount d shown in FIG. 4(a) was small, and no water leak occurred after the trial of 175,000 spots (continuous 25,000 spots per day×7 days).

Incidentally, the power of the hydraulic vise in the press-fitting amount of 2.0 mm was in the range of 1,600–1960 kg.

Also, the material of the installing portion 5a and the offset portion 5b was changed into aluminum, copper, brass, and beryllium copper, respectively. In the same way as mentioned above, after the tapered portion $t_x$ of the installing portion 5a was inserted into the first tapered hole $h_x$ of the offset portion 5b by hand, it was press-fit further, and the appropriate press-fitting amount was measured. The appropriate press-fitting amount was 1.8–7.0 mm in the case of aluminum, 0.6–4.5 mm in the case of copper, 0.5–4.2 mm in the case of brass, and 0.05–2.1 mm in the case of beryllium copper.

An R-chamfered portion having a radius R of 0.001 mm or more is provided on the periphery of the opening on the press-fitting side of the first tapered hole $h_x$ of the offset portion 5b and the periphery of the end of the tapered portion $t_x$ of the installing portion 5a. The details will be explained with reference to FIG. 5.

The reason for the radius R of the R-chamfered portion provided in the opening on the press-fitting side of the first tapered hole $h_x$ and the R-chamfered portion provided in the end of the tapered portion $t_x$ is to conduct press-fitting smoothly. In the present embodiment, the R is 0.01–0.1 mm in the opening e on the press-fitting side of the first tapered hole $h_x$ and the R is 0.01–0.2 mm in the end f of the tapered portion $t_x$.

The upper limit of the R is set for the following reasons: If the chamfered area in the opening e on the press-fitting side of the first tapered hole $h_x$ is too large, the durability will be affected. If the chamfered area in the end f of the tapered portion $t_x$ is too large, when the tapered portion $t_x$ is press-fit into the first tapered hole $h_x$ up to the top surface, the boundary interface between the offset portion 5b and the installing portion 5a will be left clearly.

On the other hand, the reason why the lower limit is set to be 0.01 mm is to facilitate chamfering processing.

The offset portion 5b and the installing portion 5a press-fit thereinto in this way are coupled securely, and they have similar strength to the case of unitary formation. Incidentally, the tip portion 5c does not need to be press-fit by a hydraulic vise or the like.

Next, the function of the curved electrode 5 will be explained hereinafter.

By forming the installing portion 5a, the offset portion 5b, and the tip portion 5c separately, the curved electrode 5 can be manufactured easily at a low cost compared to unitary formation.

Also, several kinds of curved electrodes 5 having a different offset amount can be manufactured easily by preparing several kinds of offset portions 5b having different lengths.

In order to assemble the portions into a curved electrode 5, the installing portion 5a and the offset portion 5b are engaged by press-fitting, and thereafter the water supply tube 11 is inserted from the opening of the vertical hole 8 of the installing portion 5a. The water supply tube 11 enters the axis hole 10 smoothly through the corner portion c. The tip of the water supply tube 11 faces the closed portion of the axis hole 10 near the second tapered hole $h_y$.

In operation, the water supply tube 11 is connected to a water supply pipe or the like (now shown in the drawings) of the electrode holder 4 shown in FIG. 1, and the installing portion 5a of the curved electrode 5 is fixed to the electrode holder 4 by taper engagement. The taper angle of the taper engagement between the installing portion 5a and the electrode holder 4 preferably is Morse taper, 1/10 taper, or 1/5 taper. Alternatively, it may be straight without providing a taper angle, and in this case, clamping is used.

Welding is performed in a state where cooling water is supplied into the water supply tube 11 through the water supply pipe or the like. Since the engagement between the installing portion 5a and the offset portion 5b of the curved electrode 5 is secure and the warpage amount d is small, good welding can be performed. Cooling water is ejected from the tip of the water supply tube 11 into the hole near the tip portion 5c so as to effectively cool the tip portion 5c and the offset portion 5b, and discharged through the axis hole 10, the horizontal hole 7 and the vertical hole 8. However, water never leaks from the engagement between the first tapered hole $h_x$ and the tapered portion $t_x$.

Consequently, it is possible to directly cool the curved electrode 5 although it has been impossible conventionally, and the durability of the curved electrode 5 can be improved.

When the tip portion 5c is badly worn because of repetitive use, only the tip portion 5c needs to be replaced, which is effective economically.

The present invention is not limited to the embodiments described above. Substantially the same configuration and effect as defined—encompassed by the claims of the present invention belongs to the technical scope of the present invention.

For example, in a case where the axis hole 10 can be bored from the first tapered hole $h_x$, the shape of the cooling hole formed within the installing portion 5a may be a substantially L shape instead of a substantially T shape. Also, the offset portion 5b and the tip portion 5c may be formed unitarily. In addition, the angle between the offset portion 5b and the tip portion 5c may be set optionally.

As mentioned above, according to the present invention, by forming at least the installing portion and the offset portion separately, the curved electrode can be manufactured easily at a low cost. If a part of it is damaged, only that part needs to be replaced at a low cost. Also, the curved electrode can be cooled effectively by providing a cooling hole in the inside thereof and chamfering the corner portion of the cooling hole. In addition, since the press-fitting amount between the installing portion and the offset portion is set in a predetermined range, the installing portion and the offset portion can be coupled securely so as to prevent water or the like from leaking.

What is claimed is:

1. A curved electrode for welding comprising:
   an installing portion to be installed in an electrode holder;
   an offset portion by which an offset amount is obtained; and
   a tip portion which comes into contact with a material to be welded,
   at least the installing portion being formed separately from the offset portion and engaged into a tapered hole formed within the offset portion,
   the installing portion having a substantially T-shaped or L-shaped cooling hole formed in the inside thereof and constructed of a vertical hole and a horizontal hole intersecting at a substantially right angle, and
   the offset portion having another cooling hole formed in the inside thereof so as to correspond and connect with the horizontal hole and extend toward the tip portion side,
   wherein C-chamfering or R-chamfering is conducted to at least a part of a corner on the tip portion side in the intersecting portion of the vertical hole and the horizontal hole of the installing portion.

2. The curved electrode for welding according to claim 1, wherein the tip portion is formed separately from the offset portion.

3. The curved electrode for welding according to claim 1, wherein the offset portion and the installing portion are made of nonferrous metal, and when the installing portion is fixed to the tapered hole of the offset portion by taper engagement, a tapered portion of the installing portion is inserted into the tapered hole of the offset portion by hand, and press-fit further by an amount of 7.0 mm or less.

4. The curved electrode for welding according to claim 3, wherein an R-chamfered portion having a radius R of 0.001 mm or more is provided on a periphery of the opening on a press-fitting side of the tapered hole of the offset portion and a periphery of an end of the tapered portion of the installing portion.

5. The curved electrode for welding according to claim 1, wherein a seal ring is interposed in an engagement interface between the tapered hole of the offset portion and a tapered portion of the installing portion.

6. The curved electrode for welding according to claim 2, wherein the tip portion is engaged into another tapered hole formed within the offset portion.

7. The curved electrode for welding according to claim 2, wherein the offset portion and the installing portion are made of nonferrous metal, and when the installing portion is fixed to the tapered hole of the offset portion by taper engagement, a tapered portion of the installing portion is inserted into the tapered hole of the offset portion by hand, and press-fit further by an amount of 7.0 mm or less.

8. The curved electrode for welding according to claim 1, wherein an R-chamfered portion having a radius R of 0.001 mm or more is provided on a periphery of the opening on a press-fitting side of the tapered hole of the offset portion and a periphery of a tapered end of the installing portion.

9. The curved electrode for welding according to claim 2, wherein an R-chamfered portion having a radius R of 0.001 mm or more is provided on a periphery of the opening on a press-fitting side of the tapered hole of the offset portion and a periphery of a tapered end of the installing portion.

10. The curved electrode for welding according to claim 2, wherein a seal ring is interposed in an engagement interface between the tapered hole of the offset portion and a tapered portion of the installing portion.

11. The curved electrode for welding according to claim 3, wherein a seal ring is interposed in an engagement interface between the tapered hole of the offset portion and the tapered portion of the installing portion.

12. The curved electrode for welding according to claim 4, wherein a seal ring is interposed in an engagement interface between the tapered hole of the offset portion and the tapered portion of the installing portion.

13. The curved electrode for welding according to claim 1, further comprising a coolant supply tube extending within said T-shaped or L-shaped cooling hole formed in said installing portion and within said cooling hole formed in the offset portion.

* * * * *